(12) United States Patent
Inoue et al.

(10) Patent No.: US 7,889,241 B2
(45) Date of Patent: Feb. 15, 2011

(54) IMAGING DEVICE AND IMAGING METHOD

(75) Inventors: Makoto Inoue, Tokyo (JP); Yoichiro Sako, Tokyo (JP); Toshiro Terauchi, Tokyo (JP); Yasushi Miyajima, Kanagawa (JP); Masamichi Asukai, Kanagawa (JP); Takatoshi Nakamura, Kanagawa (JP); Mitsuru Takehara, Tokyo (JP)

(73) Assignee: Sony Corporation, Tokyo (JP)

( * ) Notice: Subject to any disclaimer, the term of this patent is extended or adjusted under 35 U.S.C. 154(b) by 894 days.

(21) Appl. No.: 11/485,095

(22) Filed: Jul. 12, 2006

(65) Prior Publication Data
US 2007/0013777 A1 Jan. 18, 2007

(30) Foreign Application Priority Data
Jul. 15, 2005 (JP) .............................. 2005-206361

(51) Int. Cl.
H04N 5/228 (2006.01)
H04N 5/262 (2006.01)
G06K 9/00 (2006.01)

(52) U.S. Cl. ................. 348/222.1; 348/239; 348/208.3; 382/255

(58) Field of Classification Search ............... 348/222.1, 348/207.99, 152, 143, 154, 155, 239, 208.3; 382/255
See application file for complete search history.

(56) References Cited

U.S. PATENT DOCUMENTS

| | | | | | |
|---|---|---|---|---|---|
| 4,928,176 | A | * | 5/1990 | Schmidt et al. | ............. 348/170 |
| 5,034,986 | A | * | 7/1991 | Karmann et al. | ............. 382/103 |
| 5,067,014 | A | * | 11/1991 | Bergen et al. | ................ 382/107 |
| 5,233,417 | A | * | 8/1993 | Nouso | ................... 348/207.99 |
| 5,245,436 | A | * | 9/1993 | Alattar | ........................ 348/595 |
| 5,548,659 | A | * | 8/1996 | Okamoto | ..................... 382/107 |
| 5,877,804 | A | * | 3/1999 | Otsuki et al. | ................. 348/155 |
| 6,298,144 | B1 | * | 10/2001 | Pucker et al. | ................ 382/103 |
| 6,954,225 | B2 | * | 10/2005 | Chen | ..................... 348/207.99 |
| 2002/0180870 | A1 | * | 12/2002 | Chen | ....................... 348/207.1 |
| 2004/0032982 | A1 | * | 2/2004 | Nishizawa | ................... 382/171 |
| 2004/0239776 | A1 | * | 12/2004 | Shinohara et al. | ............ 348/239 |

(Continued)

FOREIGN PATENT DOCUMENTS

CN 1406049 A 3/2003

(Continued)

*Primary Examiner*—David L Ometz
*Assistant Examiner*—Quang V Le
(74) *Attorney, Agent, or Firm*—Wolf, Greenfield & Sacks, P.C.

(57) ABSTRACT

A imaging device includes an imaging element; a memory unit configured to temporarily store pieces of image data captured individually at predetermined timings via the imaging element; a comparator configured to compare the image data recorded in the memory unit to detect whether an image change greater than or equal to a first threshold has occurred; a determining unit configured to determine whether the image change has converged to an amount less than or equal to a second threshold by comparing the image data recorded in the memory unit when an image change greater than or equal to the first threshold has been detected; and a controller configured to exercise control so that image data captured via the imaging element is recorded on a predetermined recording medium when it is determined that the image change has converged to an amount less than or equal to the second threshold.

15 Claims, 5 Drawing Sheets

U.S. PATENT DOCUMENTS

2005/0088442 A1* 4/2005 Ota .......................... 345/473

FOREIGN PATENT DOCUMENTS

| JP | 06-149902 | 5/1994 |
| JP | 07-193510 | 7/1995 |
| JP | 7-43697 | 9/1995 |
| JP | 08-279954 | 10/1996 |
| JP | 11-317951 | 11/1999 |
| JP | 2000-115710 | 4/2000 |
| JP | 2001-197351 | 7/2001 |
| JP | 2005-050382 | 2/2005 |

* cited by examiner

IMAGING DEVICE AND IMAGING METHOD

CROSS REFERENCES TO RELATED APPLICATIONS

The present invention contains subject matter related to Japanese Patent Application JP 2005-206361 filed in the Japanese Patent Office on Jul. 15, 2005, the entire contents of which are incorporated herein by reference.

BACKGROUND OF THE INVENTION

1. Field of the Invention

The present invention relates to an imaging device that takes an image of an object and records the image as still-image data on a recording medium.

2. Description of the Related Art

In a type of anti-crime monitoring camera or the like, as soon as a change in an image captured is detected, images are started to be taken, so that when an event such as a break-in by a suspicious person occurs, an image at the time of the occurrence of the event can be recorded reliably. For example, according to techniques disclosed in Japanese Unexamined Patent Application Publication No. 50-81914, an automatic monitoring apparatus can record an image when a change occurs in an image that is being captured.

The automatic monitoring apparatus described in Japanese Unexamined Patent Application Publication No. 50-81914 extracts video signals of a plurality of points of a screen (image) from video signals of an object obtained through imaging by a television camera and converts the video signals into digital signals, and similarly processes newly obtained video signals. Then, the automatic monitoring apparatus compares digitized video signals of temporally different images corresponding to the same object to check whether an image has occurred in the image being captured, so that it is possible, for example, to activate a recording device for recording images when it is determined that a change has occurred.

Using the techniques described in Japanese Unexamined Patent Application Publication No. 50-81914, inefficient recording of images on a recording medium is prevented, and when a change in an image occurs, the image can be recorded quickly and reliably. Thus, using some techniques that have been proposed, a reliable automatic monitoring device can be constructed. Furthermore, by combining various types of sensors such as infrared sensors and temperature sensors, it is possible to accurately detect various states that are to be detected and to record the states.

SUMMARY OF THE INVENTION

In recent cameras (both digital and film), various parts take electronic forms to achieve automation, and functions such as auto exposure and auto focus are provided as ordinary functions, so that it has become possible even for unskilled persons to take images with appropriate exposure and focus. Furthermore, it is possible to compensate for insufficient exposure at the time of imaging to a certain extent by capturing an image taken by a digital camera into a personal computer and various image processing software programs available.

However, it is not to automatically take an image of a moving object with an intended composition and in an intended status. This is because it is not possible to automatically detect occurrence of the intended composition or occurrence of the intended state. As described above, it is not possible to automatically determine a composition or a right timing for taking an image. Furthermore, even if an image that has been taken is corrected by a personal computer or the like, usually, it is not possible to obtain an image of an object with an intended composition and in an intended state.

Obviously, in the case of the camera in the monitoring apparatus described in Japanese Unexamined Patent Application Publication No. 50-81914, which is fixed at a certain position so that the same object can be imaged constantly with the same composition, it is possible to detect a change in the image captured and to take an intended image at an appropriate timing. However, in the case of digital cameras used by ordinary users, a user usually carries and operates a digital camera by hands, and the object changes variously according to user's intentions, so that the techniques for the camera in the monitoring apparatus are not applicable.

As descried above, regarding composition and timing for taking still images using ordinary digital cameras, automation or correction by a personal computer is not allowed, so that these two issues remain unresolved as important points for taking good images. In the case of ordinary digital cameras, as opposed to monitoring cameras, it is desired that images are automatically taken at timings that best match user's intentions (timings in accordance with user's intentions).

It is desired that it is possible to automatically take images in accordance with user's intentions without missing right timings.

According to an embodiment of the present invention, there is provided an imaging device including an imaging element; a memory unit configured to temporarily store a plurality of pieces of image data corresponding to a plurality of images, the plurality of pieces of image data being captured individually at predetermined timings via the imaging element; comparing means for comparing the plurality of pieces of image data recorded in the memory unit to detect whether an image change greater than or equal to a first threshold has occurred; determining means for determining whether the image change has converged to an amount less than or equal to a second threshold by comparing the plurality of pieces of image data recorded in the memory unit when an image change greater than or equal to the first threshold has been detected by the comparing means; and controlling means for exercising control so that image data captured via the imaging element is recorded on a predetermined recording medium when it is determined by the determining means that the image change has converged to an amount less than or equal to the second threshold.

In the imaging device according to the embodiment, pieces of image data captured individually at predetermined timings via the imaging element are sequentially stored in the memory unit. The memory unit is capable of storing a plurality of pieces of image data, which are updated by pieces of image data sequentially captured. The memory unit stores newer and older pieces of image data sequentially captured individually at predetermined timings, for example, at least image data captured most recently and image data captured immediately before.

The comparing means compares the plurality of pieces of image data taken and recorded in the memory unit to detect whether a change greater than or equal to the first threshold has occurred. When it is determined by the comparing means that a change greater than or equal to the first threshold has occurred, the determining means determines whether the image change has converged to an amount less than or equal to the second threshold. When it is determined by the determining means that the image change has converged to an amount less than or equal to the second threshold, a new image is automatically taken and the image data taken is recorded on the recording medium under the control of the controlling means.

Then, comparison, checking, and so forth between the image data recorded in the memory unit and image data sequentially captured at predetermined timings and recorded in the memory unit are repeated so that images are automatically taken in accordance with change between image data.

Thus, for example, it is possible to avoid taking a large number of unneeded images. Furthermore, even when a user does not perform an operation for taking an image of an object, such as pressing a shutter button, a right timing for taking an image of an intended object with an intended composition can be automatically detected and an image can be taken automatically. That is, automatic imaging in accordance with user's intentions can be achieved.

According to another embodiment of the present invention, there is provided an imaging device including detecting means for detecting an amount of change in an imaging condition; determining means for determining whether the amount of change detected by the detecting means has become greater than or equal to a first threshold and then has converged to an amount less than or equal to a second threshold; and controlling means for exercising control so that image data captured via an imaging element is recorded on a predetermined recording medium when it is determined by the determining means that the amount of change has become greater than or equal to the first threshold and then has converged to an amount less than or equal to the second threshold.

In the imaging device according to the embodiment, it is possible to adjust various imaging conditions manually or automatically. When an imaging condition is adjusted, the amount of change is automatically detected by the detecting means. The result of detection output from the detecting means, representing the amount of change, is monitored by the determining means. When the amount of change has become greater than or equal to the first threshold and then has converged to an amount less than or equal to the second threshold, it is considered that the imaging device is ready to take an image of an intended object, for example, an imaging range including the object has been fixed, an image quality has been adjusted, or the intended object is in focus. Then, the controlling means controls relevant parts to automatically take an image and to record the image data on the recording medium.

Thus, for example, it is possible to avoid taking a large number of unneeded images. Furthermore, even when a user does not perform an operation for taking an image of an object, such as pressing a shutter button, a right timing for taking an image of an intended object with an intended composition can be automatically detected and an image can be taken automatically. That is, automatic imaging in accordance with user's intentions can be achieved.

According to another embodiment of the present invention, there is provided an imaging method used by an imaging device including an imaging element and including a memory unit configured to temporarily store a plurality of pieces of image data corresponding to a plurality of images, the plurality of pieces of image data being captured individually at predetermined timings via the imaging element, the imaging method including the steps of comparing the plurality of pieces of image data stored in the memory unit to detect whether an image change greater than or equal to a first threshold has occurred; determining whether the image change has converged to an amount less than or equal to a second threshold by comparing the plurality of pieces of image data recorded in the memory unit when an image change greater than or equal to the first threshold has been detected by comparison; and exercising control so that image data captured via the imaging element is recorded on a predetermined recording medium when it is determined that the image change has converged to an amount less than or equal to the second threshold.

According to another embodiment of the present invention, there is provided an imaging method including the steps of detecting an amount of change in an imaging condition; determining whether the amount of change detected has become greater than or equal to a first threshold and then has converged to an amount less than or equal to a second threshold; and exercising control so that image data captured via an imaging element is recorded on a predetermined recording medium when it is determined that the amount of change has become greater than or equal to the first threshold and then has converged to an amount less than or equal to the second threshold.

According to these embodiments of the present invention, the problems of composition or timing of taking images, which are important issues for taking good images but automatic adjustment is not possible as opposed to exposure or focus, even a user not used to taking images can take an image of an intended object with an intended composition and intended content without missing a right timing. That is, the user can automatically take good images with which the user will be satisfied.

DESCRIPTION OF THE PREFERRED EMBODIMENTS

Now, an embodiment of the present invention will be described with reference to the drawings. The embodiment will be described in the context of an example of an imaging device that is capable of imaging a target object in the form of a still image and recording the still image in the form of digital data on a recording medium, such as a digital still camera or a digital video camera.

Configuration and Basic Operation of Imaging Device

Figure 1:
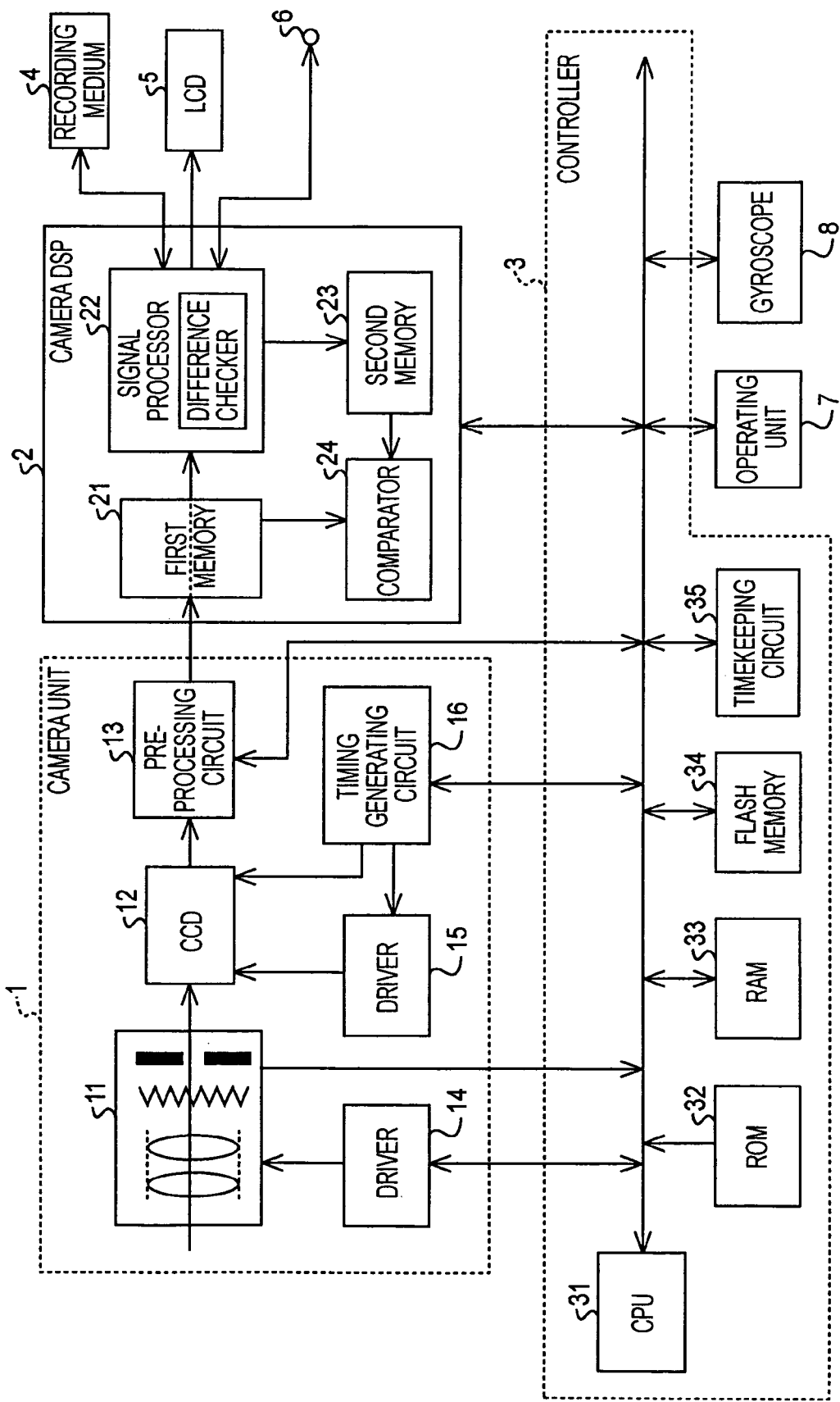
FIG. 1 is a block diagram of an imaging device according to an embodiment of the present invention.

FIG. 1 is a block diagram of an imaging device according to this embodiment. As shown in FIG. 1, the imaging device according to this embodiment generally includes a camera unit 1, a camera digital signal processor (DSP) 2, and a controller 3. Furthermore, the camera DSP 2 is connected to, for example, a removable recording medium 4 such as a semiconductor memory, a liquid crystal display (LCD) 5, and a digital input/output terminal 6. Furthermore, the controller 3 is connected to an operating unit 7 and a gyroscope (hereinafter abbreviated as a gyro) 8.

As shown in FIG. 1, the camera unit 1 includes an optical block 11, a charge coupled device (CCD) 12 as an imaging element, a pre-processing circuit 13, an optical-block driver 14, a CCD driver 15, and a timing generating circuit 16. The optical block 11 includes a lens, a focus mechanism, a shutter mechanism, an iris mechanism, and so forth. As will be described later, automatic adjustment can be exercised under the control of the controller 3 when the optical block 11 is in an automatic adjustment mode, while manual adjustment by a user is allowed when the optical block 11 is in a manual adjustment mode.

Switching between the automatic adjustment mode and the manual adjustment mode can be executed via the operating unit 7 connected to the controller 3. Although a CCD is used as an imaging element in the imaging device according to this embodiment, alternatively, for example, a complementary metal oxide semiconductor (CMOS) image sensor may be used.

The camera DSP 2 includes a first memory 21 and a second memory 23 for temporarily storing image data, a signal processor 22, and a comparator 24 for comparing image data. The first memory 21 is a first memory unit that temporarily stores image data sequentially captured at each predetermined timing via the CCD 12.

The first memory 21 has a storage capacity sufficient to record image data of at least two images (two screens). The first memory 21 is constantly prepared to temporarily store image data of a newer image and an older image individually, namely, image data captured most recently and image data captured immediately before.

More specifically, the first memory 21 has two image storage areas. When image data captured most recently has been recorded in one of the two image storage areas and image data captured immediately before has been recorded in the other, when new image data is captured, the new image data is overwritten in the storage area where the older image data has been recorded, so that image data of a newer image and an older image (two screens) can be constantly stored as described above.

The second memory 23 is a second memory unit that temporarily stores image data last taken and recorded on the recording medium 4, as will be described later. As will be described later, by comparing image data temporarily stored in the second memory 23 and image data temporarily stored in the first memory 21, it is possible to check whether an image that has significantly changed from a previously taken image has been captured.

As will be described later in detail, the signal processor 22 of the camera DSP 2 is capable of executing signal processing as need on captured image data and outputting the result to the recording medium 4, the LCD 5, or the digital input/output terminal 6, processing image data read from the recording medium 4 and outputting the result to the LCD 5 or the digital input/output terminal 6, or processing image data accepted via the digital input/output terminal 6 and recording the result on the recording medium 4 or supplying the result to the LCD 5. Furthermore, the signal processor 22 also has a function of storing most recent image data taken and recorded on the recording medium 4 in the second memory 23.

Furthermore, the signal processor 22 has a function of a difference checker. More specifically, when the difference of image data of one screen of image that is to be newly taken and recorded relative to image data of one screen of image recorded earlier is less than or equal to a predetermined value, the signal processor 22 can record the difference of the image data of one screen of image that is to be newly taken and recorded relative to the image data of one screen of image recorded earlier, as image data that is to be newly taken and recorded.

As will be described later in detail, the comparator 24 of the camera DSP 2 compares image data last taken and recorded on the recording medium 4, stored in the second memory 23, with image data sequentially stored in the first memory 21 to detect a difference therebetween and reports the difference to the controller 3, so that it is possible to check whether the newly captured image significantly varies from the image taken.

Furthermore, after a significant change between the image already taken and temporarily stored in the second memory 23 and the image newly taken arises, the comparator 24 compares older and newer image data temporarily stored in the first memory 21 to detect a difference therebetween, and reports the difference to the controller 3, so that it is possible to check whether the change between the images has converged to an amount less than or equal to a predetermined value.

The controller 3 is a microcomputer in which a central processing unit (CPU) 31, a read-only memory (ROM) 32, a random access memory (RAM) 33, a flash memory 34, and a timekeeping circuit 35 are connected via a CPU system bus. The controller 3 controls the parts of the imaging device according to this embodiment.

The CPU 31 plays a main role in controlling the imaging device by executing various programs, generating control signals supplied to various parts, and supplying the control signals to intended circuit portions. The ROM 32 stores various programs executed by the CPU 31, data needed for processing, and so forth.

The RAM 33 is used mainly as a work area, for example, to temporarily store intermediate results in the course of processing. The timekeeping circuit 35 is capable of providing a current year, month, and day, a current day of the week, and a current time, and also ahs a calendar function, so that, for example, the timekeeping circuit 35 can provide a date and time of imaging. Furthermore, the timekeeping circuit 35 also has a function of a measurement counter for measuring various periods.

The operating unit 7 connected to the controller 3 includes a power on/off key, a shutter button, a zoom operation key, and other function keys or operation knobs. The operating unit 7 accepts input operations by the user, and supplies electric signals corresponding to the operations to the controller 3.

The gyro 8 is provided inside the case of the imaging device according to this embodiment, and has two axes, namely, a vertical axis and a horizontal axis. When the imaging device according to this embodiment is panned horizontally or vertically, the gyro 8 detects the direction and amount of movement (direction and an angle of movement of panning), and reports the direction and amount to the controller 3.

When the imaging device according to this embodiment is powered on and the automatic adjustment mode is selected so that the mechanisms of the optical block 11 are controlled automatically as described earlier, the optical-block driver 14 generates driving signals for operations of the optical block 11 under the control of the controller 3, and supplies the driving signals to the optical block 11 so that the optical block 11 operates according to the driving signals. In the optical block 11, the focus mechanism, the shutter mechanism, and the iris mechanism are controlled according to the driving signals supplied from the optical-block driver 14 so that optical information corresponding to an image of an object is captured and supplied to the CCD 12, whereby an image is formed on the CCD 12.

The CCD 12 executes photoelectric conversion of the image supplied from the optical block 11 and outputs resulting electric signals. The CCD 12 operates according to driving signals supplied from the CCD driver 15. The CCD 12 captures the image of the object supplied from the optical block 11, and converts the captured image of the object (image information) into electric signals on the basis of timing signals supplied from the timing generating circuit 16 controlled by the controller 3 and supplies the electric signals to the pre-processing circuit 13.

As described earlier, the timing generating circuit 16 generates timing signals representing certain timings under the control of the controller 3. The CCD driver 15 generates driving signals supplied to the CCD 12 on the basis of the timing signals supplied from the timing generating circuit 16.

The pre-processing circuit 13 executes correlated double sampling (CDS) on the image information in the form of electric signals supplied thereto so that a favorable S/N ratio is maintained. Also, the pre-processing circuit 13 exercises automatic gain control (AGC) to control gain, executes analog/digital (A/D) conversion to generate image data in the form of digital signals, and supplies the image data to the camera DSP 2.

The camera DSP 2 temporarily stores the image data supplied from the pre-processing circuit 13 in the first memory 21, executes camera signal processing on the image data temporarily stored in the first memory 21, such as auto focus (AF), auto exposure (AE), and auto white balance (AWB), converts the resulting image data into analog video signals and supplies the analog video signals to the LCD 5, and displays an image currently captured via the optical block 11 on the LCD 5.

When image data is recorded in the first memory 21, as described earlier, the image data is recorded in a storage area where older image data has been recorded, so that image data corresponding to a newer image and an older image (two screens) captured via the CCD 12 is stored in the first memory 21.

By continuously executing the processing for displaying images captured via the camera unit 1 on the LCD 5 via the camera DSP 2, the user can recognize the current status of image capturing via the LCD 5. That is, the user can monitor via the LCD 5 the image captured by the imaging device according to this embodiment via the camera unit 1.

When the shutter button of the operating unit 7 is pressed to instruct that an image be taken, the controller 3 controls the camera DSP 2 so that image data currently captured via the camera unit 1 and displayed on the LCD 5 is temporarily stored in the second memory 23 and recorded on the recording medium 4. When image data is recorded on the recording medium 4, the image data may be compressed according to a predetermined data compression method.

As described above, the user waits for and determines a right timing for taking an image while checking the image of an object displayed on the LCD 5, the controller 3 controls relevant parts at the timing of the pressing of the shutter button so that an image of the target object is taken and so that the image data is temporarily stored in the second memory 23 and recorded on the recording medium 4.

When the manual adjustment mode is selected, in which the mechanisms of the optical block 11 are adjusted manually by the user, instead of controlling the optical-block driver 14 by the controller 3, the user is allowed to directly operate the relevant parts of the optical block 11 to control the focus mechanism and the iris mechanism. Furthermore, the shutter mechanism of the optical block 11 operates in response to a pressing operation of the shutter button of the operating unit 7.

Also in the manual adjustment mode, at the timing of pressing of the shutter button by the user, image data captured via the camera unit 1 and processed by the camera DSP 2 can be recorded on the recording medium 4.

In response to user's operations accepted via the operating unit 7, intended image data recorded in a compressed form is read from the recording medium 4, the image data is decompressed in the signal processor 22, the decompressed data is converted into analog video signals, and the analog video signals are supplied to the LCD 5 so that a corresponding image can be displayed. As described above, it is possible to use images recorded on the recording medium 4.

Obviously, it is possible to convert image data accepted via the digital input/output terminal 6 into data in a format for recording on the recording medium 4 and record the data on the recording medium 4, or to provide image data read from the recording medium 4 to an external personal computer or the like via the digital input/output terminal 6.

The digital input/output terminal 6 is a digital interface compliant with IEEE (Institute of Electrical and Electronics Engineers) 1394 or USB (Universal Serial Bus). Obviously, the digital input/output terminal 6 may be compliant with various other types of interfaces. For example, the digital input/output terminal 6 may be an input/output terminal compliant with optical or radio wireless interface.

As described above, the imaging device according to this embodiment can take an image of an object and record the image on the recording medium 4 loaded on the imaging device, and can also read image data recorded on the recording medium 4 and play back and use the image data. As described earlier, the imaging device according to this embodiment is used mainly to take still images but can also be used to take moving images and to record the moving images on the recording medium 4.

Use of Automatic Imaging Mode

In the imaging device according to this embodiment, in order not to miss a right timing of taking an image, an automatic imaging mode is provided, in which a right timing of taking an image is automatically detected and an image is automatically taken. In the automatic imaging mode, in addition to automatically detecting a right timing of taking an image and automatically taking an image, it is also possible to take an image at a timing when the shutter button is pressed by the user.

Generally, in order not to miss a right timing of taking an image, for example, a possible approach is to take images successively at predetermined intervals. In that case, it is likely that a large number of substantially the same images are recorded, which is inefficient. Thus, in the imaging device according to this embodiment, images are taken and recorded in response to occurrences of the following three events as triggers. Accordingly, without missing right timings of taking images, recording of a large number of similar images is prevented, so that inefficient use of a recording medium is prevented.

The first event relates to change in the image itself. More specifically, it is considered that the first event has occurred when a significant change in the image, such as the composition, the object, or the angle, has occurred and the change has converged. This occurs in a case where, for example, the user has changed the direction of the imaging device according to this embodiment, the target object has moved, or the object has changed its action or attitude when the object is a human being or an animal, and the change has then reached a convergence.

The second event relates to change in an imaging condition. It is considered that the second event has occurred when, for example, such a change in an imaging condition that causes a significant change in the image is caused by the user or by the automatic mechanism of the camera and then the change in the imaging condition has converged. This occurs when, for example, when the user or the automatic mechanism of the camera has changed the iris, the focal distance in the case of a zoom lens, or the focus and the change has been finished.

The third event relates to movement of the imaging device itself. It is considered that the third event has occurred when, for example, when the camera has been panned considerably and the panning has converged. This occurs, for example, when the imaging device has been considerably panned rightward or leftward or the imaging device has been considerably panned upward or downward and the movement has reached an end.

When one of the first, second, and third events occurs, an image is automatically taken even when the shutter button is not operated by the user. The first event is detected by the function of the comparator 24 provided in the camera DSP 2 of the imaging device according to this embodiment shown in FIG. 1, by calculating and monitoring the difference between image data last taken and stored in the first memory 21 and latest image data sequentially stored in the first memory 21 and thereby detecting a series of evens from occurrence to convergence of change in the image.

The second event is detected by the controller 3 of the imaging device according to this embodiment shown in FIG. 1, on the basis of the amount of change recognized in accordance with the control exercised on the optical-block driver 14 or the amount of change recognized in accordance with information from the optical block 11 representing user's manual operations. The third event is detected n the basis of outputs representing results of detection by the gyro 8 connected to the controller 3 of the imaging device according to this embodiment shown in FIG. 1.

Figure 2:
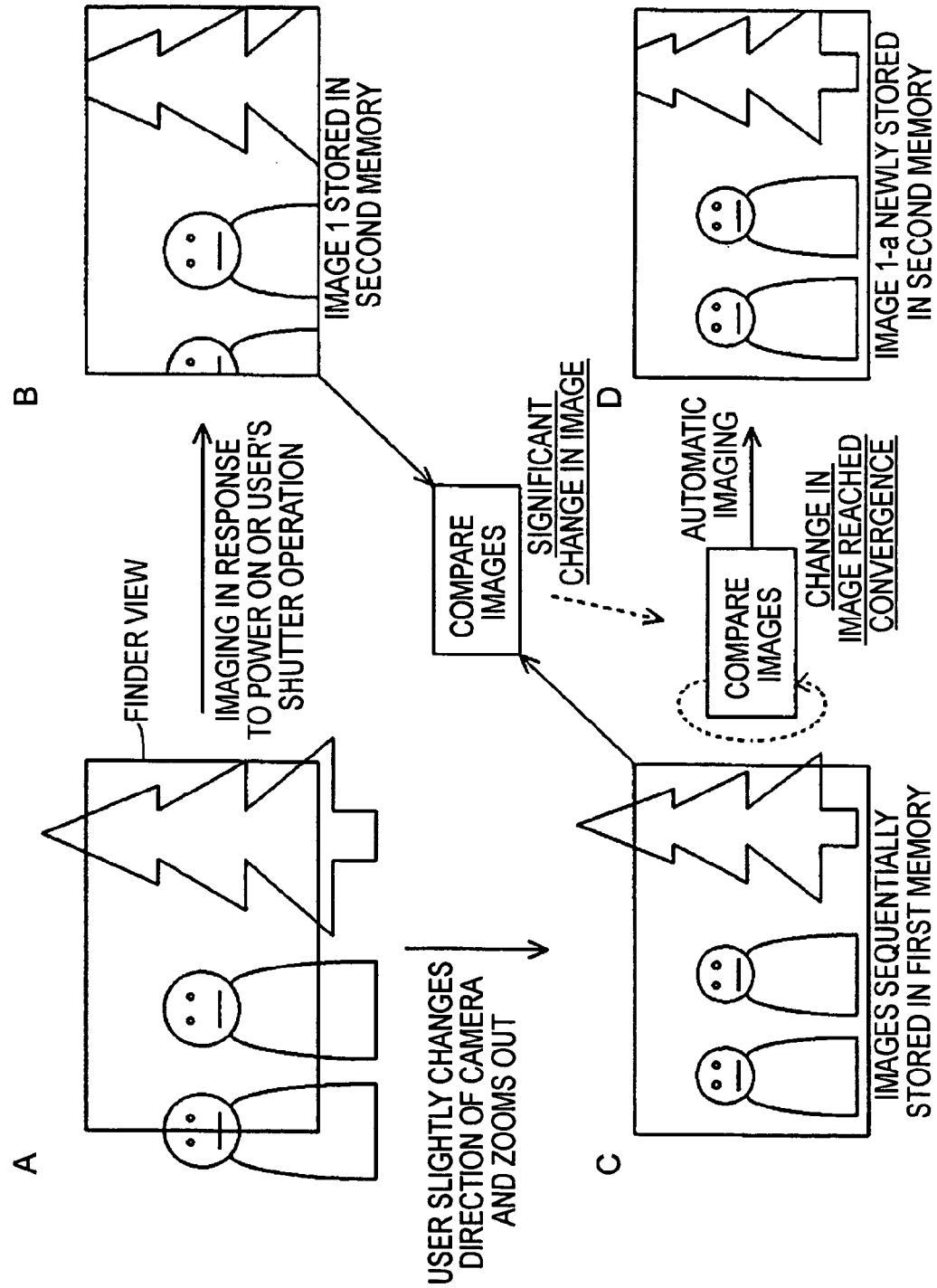
FIG. 2 is a diagram for explaining an example where an image is taken automatically on the basis of a change in an image.

Next, a specific example where an image is automatically taken in response to the first event will be described. FIG. 2 is a diagram for explaining a specific example where an image is automatically taken in response to the first event. In FIG. 2, part A shows the position of an object and the status of the finder view. In the imaging device according to this embodiment, only the image within the finder view is captured as image information. As shown in part A of FIG. 2, in this example, the object includes two persons and one tree, and part of the person on the left side as viewed in the figure is missing in the finder view (imaging area).

In the imaging device according to this embodiment, when the imaging device is powered on, image data captured at predetermined timings via the camera unit 1 is sequentially written to the first memory 21 of the camera DSP 2 and processed in the signal processor 22, whereby corresponding images are displayed on the display screen of the LCD 5. Then, when the shutter button is pressed automatically or by the user, as a first image, the image currently captured via the camera unit 1 and displayed on the LCD 5, i.e., the image shown in part A in the example shown in FIG. 2, is taken. Thus, the image data shown in part A of FIG. 2 is recorded on the recording medium 4 and temporarily stored in the second memory 23 of the camera DSP 2 in the imaging device according to this embodiment, as shown in part B of FIG. 2.

Then, when the user slightly changes the direction of the camera and adjusts the zoom, the two persons as the object are both included in the finder view and a part of the tree is included in the finder view, as shown in part C of FIG. 2. In this case, image data newly captured via the camera unit 1 and temporarily stored in the first memory 21 has the composition shown in part C of FIG. 2.

In this case, the comparator 24 of the camera DSP 2 compares the image data temporarily stored in the second memory 23 and corresponding to the image shown in part B of FIG. 2 and the image data temporarily stored most recently in the first memory 21 and corresponding to the image shown in part C of FIG. 2.

In the comparison by the comparator 24, for example, the difference between the luminance components of the image data is calculated and supplied to the controller 3. When it is determined that the difference supplied from the comparator 24 is greater than or equal to a first predetermined threshold so that a relatively considerable change has occurred in the image, the controller 3 controls the comparator 24 of the camera DSP 2 to compare newer and older image data sequentially captured at predetermined timings via the camera unit 1 and temporarily stored in the first memory 21.

As described earlier, the first memory 21 is capable of storing image data of at least two images (two screens), and image data sequentially captured at each predetermined timing is overwritten in a storage area where image data captured at an older timing has been recorded. As a result, image data captured most recently and image data captured immediately before (image data captured at a timing immediately before the timing when the most recent image data is captured) are constantly stored temporarily in the first memory 21.

Thus, the comparator 24 of the camera DSP 2 compares newer and older image data each time newly captured image data is stored in the first memory 21. Also in this case, the difference between the luminances of the newer and older image data temporarily stored in the first memory 21 is calculated and supplied to the controller 3.

When the difference between the newer and older image data temporarily stored in the first memory 21 has become less than or equal to a second predetermined threshold, i.e., when the change from the status of the image shown in part C of FIG. 2 is no longer significant so that the difference between the images relevant to comparison has become small, the controller 3 determines that the change in the image has converged. Then, the controller 3 controls relevant parts such as the camera unit 1 and the camera DSP 2 so that the image currently captured via the camera unit 1 is taken as shown in part C of FIG. 2 and so that the image data taken is stored in the second memory 23 and recorded on the recording medium 4 as shown in part D of FIG. 2.

Thus, when the image newly captured via the camera unit 1 has considerably changed compared with the image data last taken and recorded on the second memory 23 and the recording medium 4, at a timing of detection of convergence of the change in the image, the image after the convergence of the change can be taken and recorded on the recording medium 4 without a user's operation of pressing the shutter button or the like.

In this case, as opposed to the case where images are automatically taken at predetermined intervals, the primary condition is that a newly captured image has significantly changed from an image taken immediately before. Thus, a situation where a large number of similar images are taken is prevented. Accordingly, inefficient use of a recording medium can be prevented, and it is possible to find an intended image quickly.

As described above, in the imaging device according to this embodiment, when the imaging device is powered on or in response to a shutter operation by the user, an image 1 shown in part B of FIG. 2 is recorded. While the user does not change the direction of the camera or the persons as the object do not move, a next imaging operation does not occur automatically. However, an image captured by the imaging element and obtained at each predetermined timing is temporarily stored in the first memory 21 and compared with an image that has already been recorded in the second memory 23, shown in part B of FIG. 2.

Then, when the user operates the camera to change the direction of the camera slightly leftward and to zoom out so that the persons are both included within the finder view, as shown in part C of FIG. 2. Then, the image captured by the imaging element, shown in part C of FIG. 2, has significantly changed from the image already recorded, shown in part B of FIG. 2. Thus, when the change has been detected and the change in the image has converged, an image newly captured via the camera unit 1 can be taken and the image shown in part D of FIG. 2 can be recorded on the recording medium 4.

Then, each time a significant change occurs in the image and the change reaches a convergence, for example, when the user performs zooming or changes the direction of the camera or when the persons as object change, the change can be detected and an image can be taken automatically. Accordingly, images in accordance with user's intentions can be taken without missing right timings of taking images.

Although the difference between average luminances of images is used to compare the images in the example described above, images may be compared on the basis of the difference in other parameters. For example, the magnitude of change in the image may be recognized on the basis of the difference between average color tones of images relevant to comparison. In this case, for example, a change from an image with a bright color tone such as blue or red to an image with a dark color tone such as gray or black is detected so that an image can be taken automatically when the change in the color tone of the image has converged.

Alternatively, local information, such as the difference in the RGB value (the value of a color signal of red (R), green (G), and blue (B)) of each pixel with an image already recorded, may be accumulated over the entire screen, so that it is determined that a significant change has occurred when the resulting value has exceeded a predetermined threshold and that the change in the image has converged when the resulting value has converged within a predetermined value.

Yet alternatively, the position or direction of an object in the screen or the presence or absence of an object may be detected using certain image recognition techniques to check whether a predetermined threshold has been exceeded. For example, edges of an object in each image relevant to comparison are detected, and the difference regarding the presence or absence of the object or the position or direction of a common object is detected, thereby determining whether a significant change has occurred between the images relevant to comparison, and when a significant change has occurred, whether the change has converged.

Thus, when it is detected that a characteristic object becomes absent or newly emerges between images relevant to comparison or the position or direction of a characteristic object has changed, it is determined that a significant change has occurred between the images relevant to comparison. When different objects no longer exist or when the position or direction of the object does not differ significantly, it is determined that the change in the image has converged.

Alternatively, it is possible to check matching between images relevant to comparison to determine a degree of matching, so that it is determined that a significant change has occurred when the degree of matching is low and that the change in the image has converged when the degree of matching then increases. Conversely, it is possible to determine a degree of mismatch, so that it is determined that a significant change in the image has occurred when the degree of mismatch is high and that the change in the image has converged when the degree of mismatch then decreases.

As described above, when an image captured by the imaging device according to this embodiment significantly changes when the user changes the direction of the imaging device or makes various adjustments regarding focus, zoom, or the like in order to take an intended image, so that the intended image can be captured with an intended composition, usually, the user tries to maintain the direction of the imaging device and makes various adjustments only slightly.

Thus, after the image captured by the imaging device has significantly changed, when the image captured no longer changes or changes only slightly, it is determined that the intended image can be captured with an intended composition. Accordingly, an image of an intended object with an intended composition can be captured automatically at an intended timing without missing a right timing of taking an image.

Although the magnitude of a change in an image is determined using the first memory 21 and the second memory 23 in the embodiment described above, obviously, the magnitude of a change in an image may be determined by comparing most recent image data and immediately preceding image data captured at predetermined timings.

Differential Recording of Image Data at Time of Imaging

When image data that has been taken is recorded on the recording medium 4, instead of recording the entire image data most recently taken, the difference of the image data most recently taken relative to a base image (e.g., the image shown in part B of FIG. 2) for which the entire data of one screen has been recorded immediately before is calculated, and the difference is recorded on the recording medium 4 as image data that has been taken. Accordingly, it is possible to reduce the amount of data recorded and to thereby promote efficient use of the recording medium 4.

However, when an image that is to be recorded is totally different from the base image for which the entire data of one screen has been recorded immediately before, even when the difference between these images is calculated, the amount of data is not necessarily reduced. Thus, in the imaging device according to this embodiment, a difference checker provided in the signal processor 22 of the camera DSP 2 first calculates the difference of image data most recently taken with a base image for which the entire data of one screen has been recorded immediately before, and the difference data is recorded as a differential image on the recording medium 4 when the amount of data of the difference is less than or equal, to a certain threshold.

As described above, difference data of image data most recently taken relative to a base image for which the entire data of one screen has been recorded immediately before is sequentially calculated. When the difference data is less than or equal to the predetermined threshold, it is determined that the images are similar, so that the difference data is recorded as an image subject to the base image as a differential image 1-*a*, 1-*b*, . . . .

As described above, preferably, a base image and a differential image subject to the base image are recorded together as a single group for the purpose of subsequent processing. Thus, for example, when two differential images are subject to a base image, as indices to the individual image data, subnumbers (_00, _01, and _02) are attached to a certain number, such as "base image: 001234567_00", "differential image 1: 001234567_01", and "differential image 2: 001234567_02". Alternatively, it is possible to create a folder in a recording medium and to store a group of a base image and differential images in the same folder.

When the difference between the base image for which the entire data of one screen has been recorded immediately before and the image most recently taken is large, the similarity between these images is low. In this case, it is not possible to reduce the amount of data, and the accuracy of reproduction of the image could be deteriorated. Thus, the image newly taken is considered as a base image and the entire image data thereof is recorded on the recording medium 4. Thus, when the imaging device is directed toward a completely different imaging target, the entire data of the image newly taken is recorded on the recording medium 4 so that the accuracy of reproduction of the image will not be degraded.

When the differential image recorded on the recording medium 4 is played back, processing is executed so that the difference data of the differential image is reflected on an associated base image, so that the original image can be reconstructed for playback and displayed on the LCD 5 or otherwise used.

Use of Other Events

In the embodiment described above, as described with reference to FIG. 2, a timing of imaging in accordance with a user's intention is detected on the basis of the first event, i.e., a change in an image itself, and an image of an intended object is automatically taken at the timing detected. However, the present invention is not limited to this embodiment. As described earlier, it is possible to detect a timing of imaging in accordance with a user's intention on the basis of the second event, i.e., a change in an imaging condition, or on the basis of the third event, i.e., a change in movement of the imaging device itself, and to automatically take an image of an intended object at the timing detected.

As described earlier, the second event, i.e., a change in an imaging condition, refers to a change in an imaging condition of the imaging device according to this embodiment itself. More specifically, the second event refers to a change in a parameter whose value can be adjusted continuously (gradually), such as a focus, a zoom, an iris, or the like. In the automatic adjustment mode, the amount of change in the focus, zoom, iris, or the like is directly recognized by the controller 3 since the controller 3 itself controls the optical block 11. In the manual adjustment mode, information corresponding to a user's operation of the optical block 11 is reported to the controller 3.

Thus, the controller 3 can recognize the amount of change in the focus, zoom, iris, or the like corresponding to the amount of adjustment of the optical block 11. When the amount of change recognized is greater than or equal to a first predetermined threshold, the controller 3 determines that a change in an imaging condition has occurred, and determines that the change in the imaging condition has converged when the amount of change then becomes less than or equal to a second predetermined threshold, so that an image can be taken automatically.

The third event, i.e., a change in movement of the imaging device itself, refers to movement by camera panning of the imaging device. The imaging device according to this embodiment includes the gyro 8. When the imaging device according to this embodiment is panned, the imaging device can recognize a direction in which the imaging device is panned (direction of panning) and an angle at which the imaging device is moved (angle of movement by panning) on the basis of results of detection by the gyro 8.

The direction of panning in this case is usually the horizontal direction or the vertical direction as viewed from the user. It is determined that the movement angle has changed when a change in the direction of the imaging device greater than or equal to a first predetermined threshold has been detected, and it is determined that the change in the movement angle has converged when the change in the movement angle then becomes less than or equal to a second predetermined threshold, so that an image can be taken automatically.

When the third event is used, presumably, an image changes considerably more often in association with horizontal panning than in association with vertical panning. Thus, preferably, the fist threshold relevant to horizontal panning is chosen to be relatively small while the first threshold relevant to vertical panning is chosen to be relatively large, so that sensitive detection of and quick response to vertical panning, which causes more effect on images, can be achieved.

Operations of the Imaging Device in Response to the Individual Events

Next, processes for automatically taking images in response to the first, second, and third events described above, even when the shutter button is not pressed by the user, will be described with reference to flowcharts shown in FIGS. 3 to 5.

First, an operation in a case where the first event (change in an image) is used will be described. FIG. 3 is a flowchart of an operation of the imaging device in a case where an image is automatically taken in response to the first event, i.e., a change in an image. The process shown in FIG. 3 is executed by the controller 3 controlling relevant parts.

Figure 3:
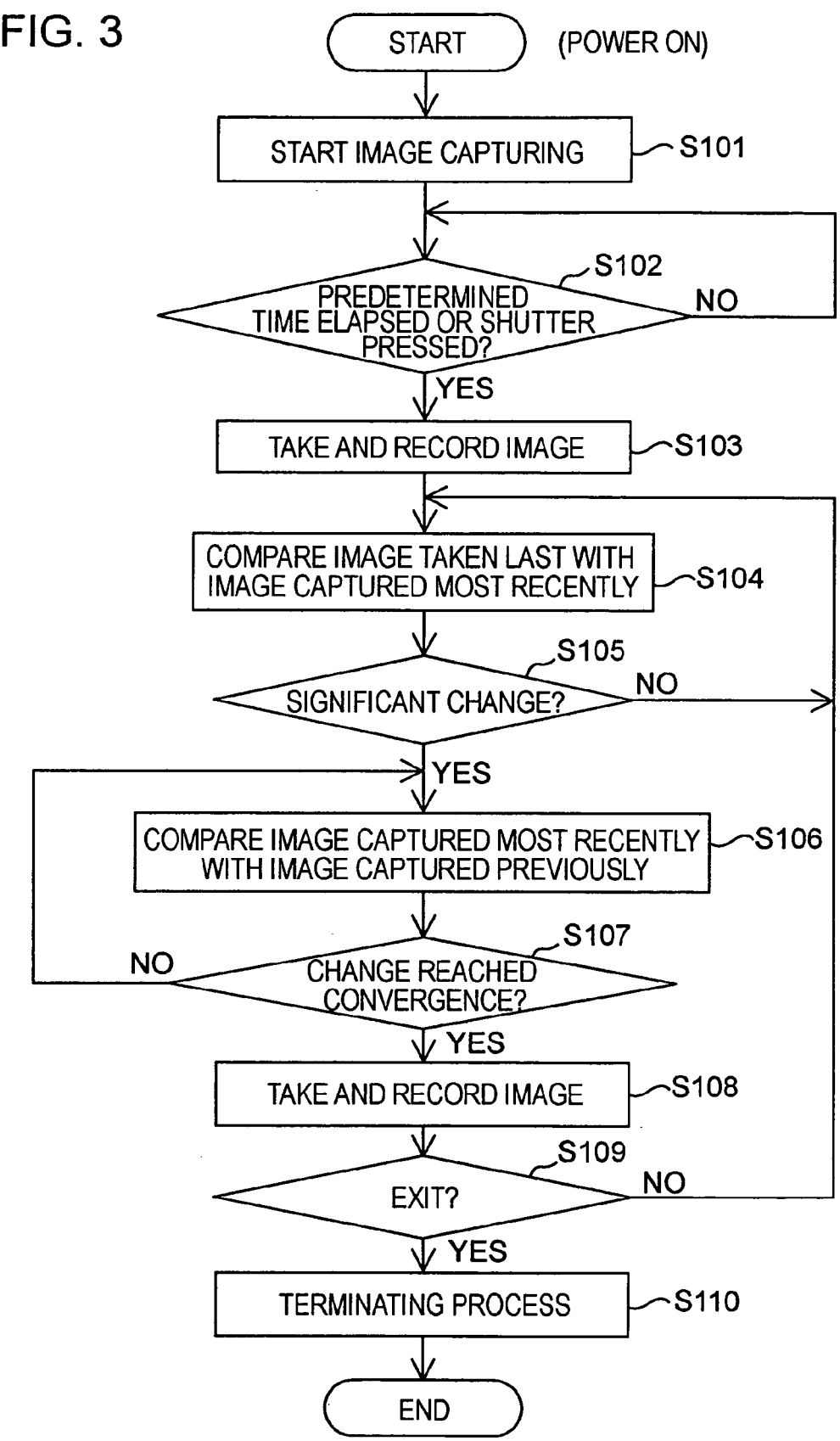
FIG. 3 is a flowchart of an operation of the imaging device in a case where an image is taken automatically on the basis of a change in an image.

When the imaging device according to this embodiment is powered on, the controller 3 executes the process shown in FIG. 3. In step S101, the controller 3 controls the camera unit 1, the camera DSP 2, and so forth to sequentially capture images via the optical block 11 of the camera unit 1. More specifically, the controller 3 controls the camera unit 1, the camera DSP 2, and the LCD 5 to sequentially capture images via the optical block 11 of the camera unit 1, write the images to the first memory 21 of the camera DSP 2, process the images in the signal processor 22 and supply the results, and display the captured images on the display screen of the LCD 5, so that the user can recognize the images captured by the imaging device.

In step S102, in order to quickly and appropriately obtain the first image that is to be used for comparison, the controller 3 waits until a predetermined time elapses after the imaging device is powered on or until the shutter button is pressed by the user. Whether the predetermined time has elapsed can be determined by measuring the time elapsed since the imaging device is powered on, using the timekeeping circuit 35.

When it is determined in step S102 that the predetermined time has elapsed after power on or the shutter button has been pressed by the user, in step S103, the controller 3 controls the camera unit 1 and the camera DSP 2 so that an image currently in view is taken, and image data most recently recorded on the first memory 21 via the camera unit 1 is recorded on the recording medium 4 and the second memory 23.

In step S104, the controller 3 controls the camera DSP 2 to compare, by the comparator 24 of the camera DSP 2, image data most recently captured by the camera unit 1 and temporarily stored in the first memory 21 with image data last taken and temporarily stored in the second memory 23. As described earlier, the comparison in step S104 involves detection of a difference based on brightness, color tone, or RGB value of each pixel, or detection of a difference using image recognition techniques.

Upon receiving a report of the result of comparison from the comparator 24, in step S105, the controller 3 checks whether a significant change in image greater than or equal to the first predetermined threshold has occurred between images relevant to comparison. When it is determined in step S105 that a significant change in image has not occurred, the process returns to step S104, and comparison between a newly captured image and an image last taken is repeated.

When it is determined in step S105 that a significant change in image has occurred, in step S106, the controller 3 controls the camera DSP 2 so that a newer image and an older image temporarily stored in the first memory 21 are compared by the comparator 24. Similarly to the comparison in step S104, the comparison in step S106 also involves detection of a difference between two images relevant to comparison based on brightness, color tone, or RGB value of each pixel, or detection of a difference using image recognition techniques.

In step S107, on the basis of the result of comparison reported from the comparator 24, the controller 3 checks whether the change in image between the images relevant to comparison has become less than or equal to the second predetermined threshold so that the change in image, which may be occurring continuously, has converged. When it is determined in step S107 that the change in image has not converged, the process returns to step S106, and comparison between an image newly taken and an image previously taken is repeated.

When it is determined in step S107 that the change in image has converted, in step S108, the controller 3 controls the camera unit 1 and the camera DSP 2 to take an image currently captured so that image data most recently recorded in the first memory 21 via the camera unit 1 is recorded on the recording medium 4 and the second memory 23. Thus, the image temporarily stored in the second memory 23 changes.

In step S109, the controller 3 checks whether an operation for turning off power of the imaging device has been performed via the operating unit 7 so that the status where imaging is allowed has been exited. When the status has not been exited, the process returns to step S104, and comparison between an image newly taken and an image most recently captured in the first memory 21 is repeated.

When it is determined in step S109 that an operation for exiting has been performed, in step S110, the controller 3 controls relevant parts to execute a terminating process including termination of capturing of images via the camera unit 1. The process shown in FIG. 3 is then exited.

As described above, on the basis of change in an image captured by the imaging device, a right timing of taking an image in accordance with a user's intention is predicted and identified on the basis of the change in image without missing the timing, so that an image can be taken automatically even if the user does not press the shutter button.

Next, an operation in a case where the second event (change in an imaging condition) is used will be described. FIG. 4 is a flowchart of an operation of the imaging device in a case where an image is automatically taken in response to the second event, i.e., a change in an imaging condition. The process shown in FIG. 4 is executed by the controller 3 controlling relevant parts.

Figure 4:
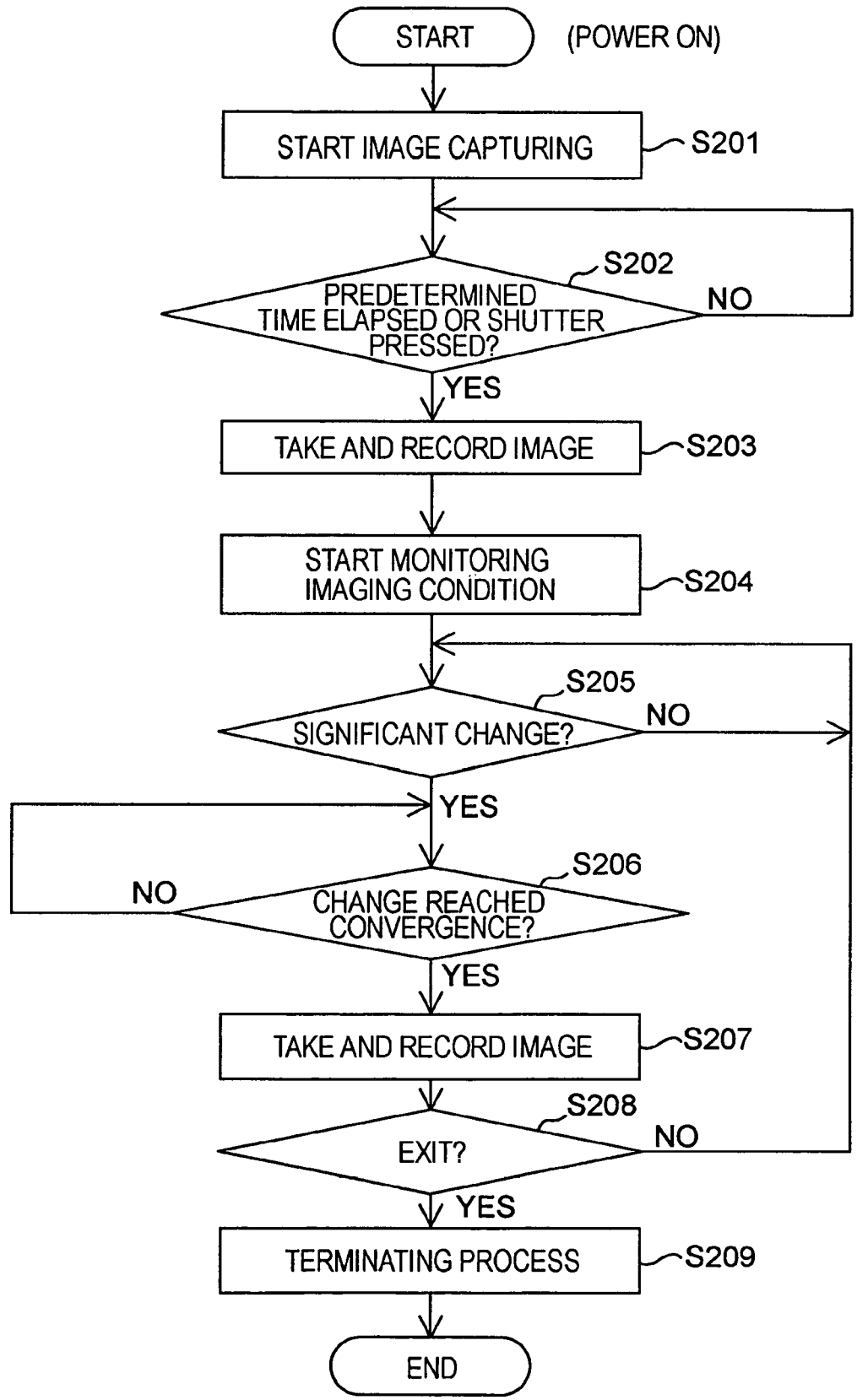
FIG. 4 is a flowchart of an operation of the imaging device in a case where an image is taken automatically on the basis of a change in an imaging condition.

When the imaging device according to this embodiment is powered on, the controller 3 executes the process shown in FIG. 4. Processing in steps S201 to S203 shown in FIG. 4 is executed similarly to the processing in steps S101 to S103 shown in FIG. 3. When the processing in step S203 is executed so that an image is taken for the first time after the imaging device is powered on, in step S204, the controller 3 starts monitoring an imaging condition.

In step S204, the amount of change in one or more parameters, such as a focus, a zoom, and an iris, is monitored individually. In step S205, the controller 3 checks whether a significant change in the imaging condition being monitored greater than or equal to the first predetermined threshold has occurred.

When it is determined in step S205 that a significant change in the imaging condition has not occurred, the monitoring of the imaging condition is continued and the processing in step S205 is repeated. When it is determined in step S205 that a significant change has occurred, the monitoring of the amount of change in the imaging condition is continued, and in step S206, it is checked whether the amount of change in the imaging condition being monitored has converted to an amount less than or equal to the second predetermined threshold.

When it is determined in step S206 that the change in the imaging condition has not converged, the monitoring of the imaging condition is continued and the processing in step S206 is repeated. When it is determined in step S206 that the change in the imaging condition has converged, in step S207, the controller 3 controls the camera unit 1 and the camera DSP 2 to take an image currently captured so that image data most recently recorded on the first memory 21 via the camera unit 1 is recorded on the recording medium 4 and the second memory 23. Thus, the image temporarily stored in the second memory 23 changes.

In step S208, the controller 3 checks whether an operation for turning off power of the imaging device has been performed via the operating unit 7 so that the status where imaging is allowed has been exited. When the status has not been exited, the process returns to step S205, and the monitoring of the imaging condition is continued.

When it is determined in step S208 that an operation for exiting has been performed, in step S209, the controller 3 controls relevant parts to execute a terminating process including termination of capturing of images via the camera unit 1. The process shown in FIG. 4 is then exited.

As described above, on the basis of change in an imaging condition of the imaging device, a right timing of taking an image in accordance with a user's intention is predicted and identified on the basis of the change in image without missing the timing, so that an image can be taken automatically even if the user does not press the shutter button.

Although one or more imaging conditions among a focus, a zoom, and an iris are used in the embodiment described above, the present invention is not limited to the embodiment. For example, when the user changes a focal point in the finder view (camera view) at which an image is to be focused, it is possible to take an image automatically when the change is greater than or equal to a predetermined value, for example, when the focal point is changed from the middle of the finder view to the left end of the finder view.

Alternatively, it is possible to take an image automatically when the shutter speed has been changed by an amount greater than or equal to a predetermined value. Also, when various conditions regarding an image that is taken are changed in the imaging device according to this embodiment, for example, when an image quality is changed, it is possible to automatically taken an image when the change is greater than or equal to a first predetermined threshold and the change has converged to an amount less than or equal to a second predetermined threshold.

Next, an operation in a case where the third event (change in movement of the imaging device) is used will be described. FIG. 5 is a flowchart of an operation of the imaging device in a case where an image is automatically taken on the basis of the third event, i.e., a change in movement of the imaging device. The process shown in FIG. 5 is executed by the controller 3 controlling relevant parts.

Figure 5:
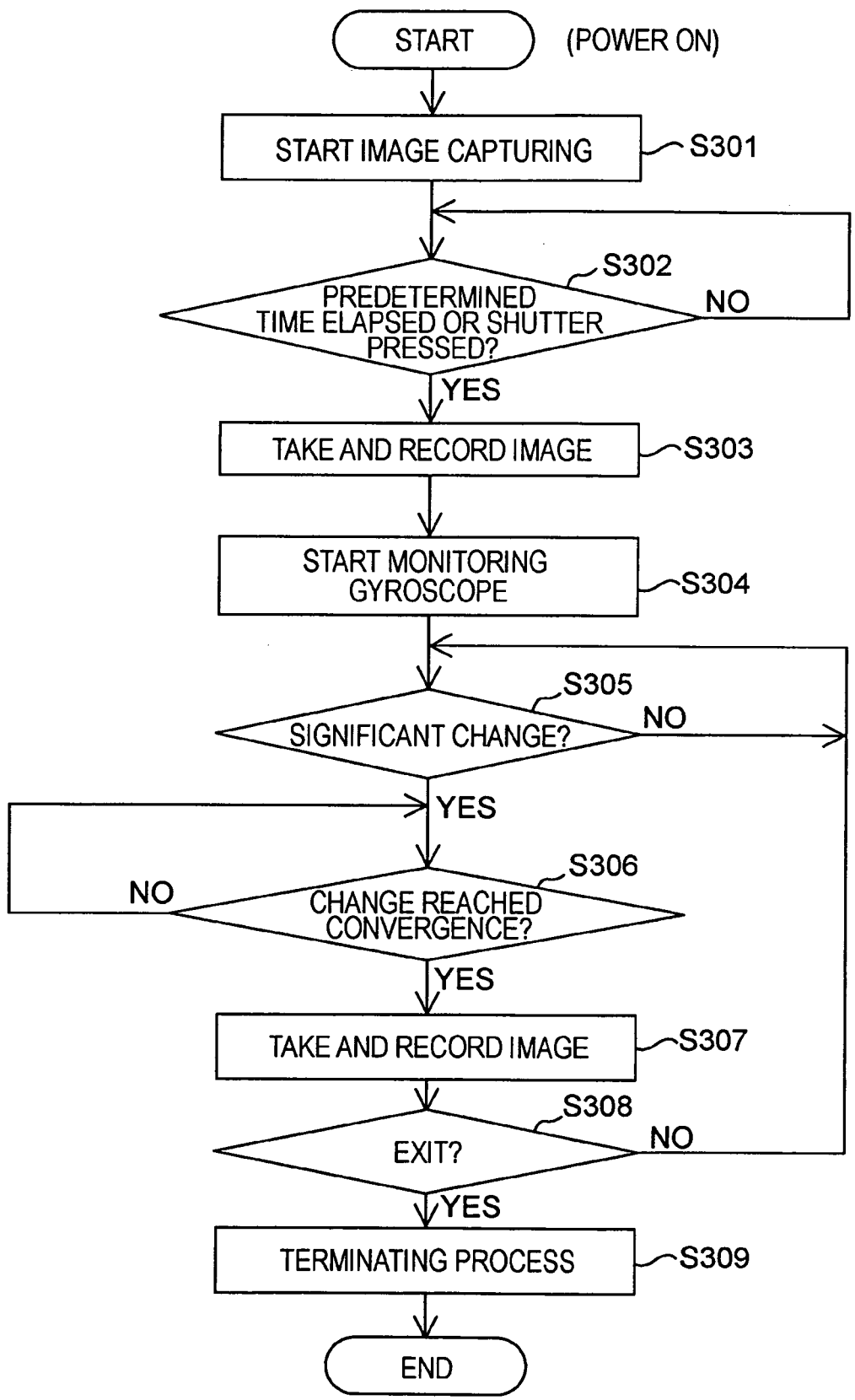
FIG. 5 is a flowchart of an operation of the imaging device in a case where an image is taken automatically on the basis of a change in movement of the imaging device.

When the imaging device according to this embodiment is powered on, the controller 3 executes the process shown in FIG. 5. Processing in steps S301 to S303 shown in FIG. 5 is executed similarly to the processing in steps S101 to S103 shown in FIG. 3. When the processing in step S303 is executed so that an image is taken for the first time after the imaging device is powered on, in step S304, the controller 3 starts monitoring the status of the gyro 8 mounted on the imaging device according to this embodiment.

The gyro 8 mounted on the imaging device according to this embodiment is a two-axis gyro, which is capable of detecting the directions and angles of rotation with respect to both the horizontal direction and the vertical direction. In step S305, the controller 3 checks whether a significant change greater than or equal to the first predetermined threshold has been detected on the basis of a detection result output from the gyro 8 being monitored.

When it is determined in step S305 that a significant change has not been detected by the gyro 8, the monitoring of the detection result output from the gyro 8 is continued, and the processing in step S305 is repeated. When it is determined in step S305 that a significant change has been detected, the monitoring of the detection result output from the gyro 8 is continued, and in step S306, it is checked whether the detection result output from the gyro 8 has converged to a value less than or equal to the second predetermined threshold.

When it is determined in step S306 that the detection result output from the gyro 8 has not converged, the monitoring of the detection result output from the gyro 8 is continued, and the processing in step S306 is repeated. When it is determined in step S306 that the detection result output from the gyro 8 has converged, in step S307, the controller 3 controls the camera unit 1 and the camera DSP 2 to take an image currently captured so that image data most recently recorded on the first memory 21 via the camera unit 1 is recorded on the recording medium 4 and the second memory 23. Thus, the image temporarily stored in the second memory 23 changes.

In step S308, the controller 3 checks whether an operation for turning off power of the imaging device has been performed via the operating unit 7 so that the status where imaging is allowed has been exited. When the status has not been exited, the process returns to step S305, and the monitoring of the detection result output from the gyro 8 is continued.

When it is determined in step S308 that an operation for exiting has been performed, in step S309, the controller 3 controls relevant parts to execute a terminating process including termination of capturing of images via the camera unit 1. The process shown in FIG. 5 is then exited.

As described above, on the basis of change in the detection result output from the gyro 8 mounted on the imaging device, a right timing of taking an image in accordance with a user's intention is predicted and identified on the basis of the change in image without missing the timing, so that an intended image can be taken automatically even if the user does not press the shutter button.

Although the first event (change in an image), the second event (change in an imaging condition), and the third event (movement of the imaging device) are used individually. Obviously, however, it is possible to use all of the first, second, and third events.

When the imaging device according to the embodiment described above is powered on and the direction of the imaging device, zooming, iris, or the like is adjusted by an operation, or when a certain change occurs in relation to an object even if such an operation is not performed, an image can be taken automatically at a timing of the end of the operation or a timing of convergence of the change. It can be expected images taken in the manner described above include images taken with good angles and at appropriate timings.

Even when images are taken automatically as described above, recording is refrained unless a change in image occurs. Thus, it is possible to avoid taking a large number of similar images and using up the capacity of a recording medium, and to save the labor of picking up a favorable image by visually checking a large number of similar images after taking images.

Furthermore, by recording a base image and differential images, it is possible to save the storage space of a recording medium, and to check how an image has changed from a base image immediately after taking the image. Obviously, it is possible to reconstruct an original image and to print out or view the reconstructed image by combining a differential image with a base image.

Furthermore, with all the features described above, the difficulty of determining an angle and timing of taking an image, which is a remaining issue for taking a good image, is overcome, so that even a novice can readily take a good image beyond his/her ability.

In the case of the imaging device according to the embodiment described above, it is possible to make setting so that a timing of automatic imaging often arrives before the user presses the shutter button. Thus, it is possible to avoid missing a right timing for taking an image. Particularly, for example, when an image of a rapidly moving object is taken, images of the object can be taken reliably and appropriately.

When an image is automatically taken by the imaging device according to the embodiment described above, the user does not perform operations such as pressing of the shutter button, so that blurring does not occur in the images taken.

The present invention can be applied to various imaging devices that are capable of taking still images and recording the still images in the form of digital data. Furthermore, the techniques for predicting right timings for taking images and automatically taking images on the basis of the second or third event can bee applied, for example, to analog cameras (film cameras).

In the embodiment described above, the comparator 24 of the camera DSP 2 and the controller 3 cooperate to function as comparing means and determining means, and the controller 3 also functions as controlling means. Furthermore, mainly the difference checker of the camera DSP 2 functions as checking means. Furthermore, mainly the controller 3 cooperates with other parts to function as detecting means and determining means.

It should be understood by those skilled in the art that various modifications, combinations, sub-combinations and alterations may occur depending on design requirements and other factors insofar as they are within the scope of the appended claims or the equivalents thereof.

What is claimed is:
1. An imaging device comprising:
an imaging element;

a memory unit configured to temporarily store a plurality of pieces of image data corresponding to a plurality of images, the plurality of pieces of image data being captured individually at predetermined timings via the imaging element;

comparing means for comparing the plurality of pieces of image data recorded in the memory unit to detect whether an image change greater than or equal to a first threshold has occurred between a first piece of image data and a second piece of image data;

determining means for determining, when the image change greater than or equal to the first threshold has been detected by the comparing means, whether a subsequent image change for subsequent pieces of image data captured following the first piece of image data and second piece of image data has converged to an amount less than or equal to a second threshold by comparing the plurality of pieces of image data recorded in the memory unit; and controlling means for exercising control so that image data captured via the imaging element is recorded on a predetermined recording medium when it is determined by the determining means that the subsequent image change has converged to an amount less than or equal to the second threshold.

2. The imaging device according to claim 1,
wherein the memory unit includes
a first memory configured to temporarily store the plurality of pieces of image data that are captured individually at predetermined timings via the imaging element, and
a second memory configured to temporarily store a piece of image data that is taken last,
wherein the comparing means compares one of the plurality of pieces of image data recorded in the first memory with the piece of image data stored in the second memory to detect whether an image change greater than or equal to the first threshold has occurred,
wherein the determining means compares the plurality of pieces of image data recorded in the first memory to determine whether the subsequent image change has converted to an amount less than or equal to the second threshold, and
wherein the controlling means records the image data captured via the imaging element on the second memory and the predetermined recording medium.

3. The imaging device according to claim 1, further comprising checking means for checking whether a difference between a piece of image data for which image data of one screen is last recorded on the predetermined recording medium and a piece of image data newly taken is less than or equal to a predetermined value,
wherein the controlling means exercises control so that the difference is recorded on the predetermined recording medium as the newly taken image data when it is determined by the checking means that the difference is less than or equal to the predetermined value.

4. The imaging device according to claim 3,
wherein the controlling means exercises control so that the image data for one screen and difference data associated with the image data are recorded as a group on the predetermined recording medium.

5. The imaging device according to claim 1,
wherein the image change detected by the comparing means and the subsequent image change determined by the determining means is a change in an average luminance of an image.

6. The imaging device according to claim 1,
wherein the image change detected by the comparing means and the subsequent image change determined by the determining means is a change in an average color tone of an image.

7. The imaging device according to claim 1,
wherein the image change detected by the comparing means and the subsequent image change determined by the determining means relates to at least one of the presence or absence of an object, difference in a position of an object, and difference in a direction of an object between pieces of image data that are compared.

8. An imaging method used by an imaging device to determine when to perform an image capture process by detecting that an amount of change in a plurality of precaptured images has decreased below a threshold, the imaging device including an imaging element and including a memory unit configured to temporarily store a plurality of pieces of image data corresponding to the plurality of precaptured images, the plurality of pieces of image data being captured individually at predetermined timings via the imaging element, the imaging method comprising:

comparing at least two pieces of image data stored in the memory unit to detect whether an image change greater than or equal to a first threshold has occurred between the at least two pieces of image data;

if an image change greater than or equal to the first threshold is detected, analyzing at least two second pieces of image data captured after the at least two pieces of image data to determine whether a second image change less than or equal to a second threshold has occurred between the at least two second pieces of image data by comparing the at least two second pieces of image data of the plurality of pieces of image data recorded in the memory unit; and if it is determined that the image change has converged to an amount less than or equal to the second threshold, exercising a control so that image data captured via the imaging element is recorded on a predetermined recording medium.

9. The imaging method according to claim 8,
wherein the memory unit includes
a first memory configured to temporarily store a plurality of pieces of image data that are captured individually at predetermined timings via the imaging element, and
a second memory configured to temporarily store a piece of image data that is taken last,
wherein the comparing compares one of the plurality of pieces of image data recorded in the first memory with the piece of image data stored in the second memory to detect whether an image change greater than or equal to the first threshold has occurred,
wherein whether the image change has converted to an amount less than or equal to the second threshold is determined by comparing at least two second pieces of image data of the plurality of pieces of image data recorded in the first memory to determine, and
wherein the control is exercised so that the image data captured via the imaging element is recorded on the second memory and the predetermined recording medium.

10. The imaging method according to claim 8, further comprising the step of checking whether a difference between a piece of image data for which image data of one screen is last recorded on the predetermined recording medium and a piece of image data newly taken is less than or equal to a predetermined value, wherein the control is exercised so that the difference is recorded on the predetermined recording medium as the newly taken image data when it is determined by the checking that the difference is less than or equal to the predetermined value.

11. The imaging method according to claim 10, wherein the control is exercised so that the image data for one screen and difference data associated with the image data are recorded as a group on the predetermined recording medium.

12. The imaging method according to claim 8, wherein the image change detected when comparing the plurality of pieces of image data and determining whether the image change has converged is a change in an average luminance of an image.

13. The imaging method according to claim 8, wherein the image change detected when comparing the plurality of pieces of image data and determining whether the image change has converged is a change in an average color tone of an image.

14. The imaging method according to claim 8, wherein the image change detected when comparing the plurality of pieces of image data and determining whether the image change has converged relates to at least one of the presence or absence of an object, difference in a position of an object, and difference in a direction of an object between images that are compared.

15. An imaging device comprising:

an imaging element;

a memory unit configured to temporarily store a plurality of pieces of image data corresponding to a plurality of images, the plurality of pieces of image data being captured individually at predetermined timings via the imaging element;

a comparator configured to compare the a first piece of image data and a second piece of image data recorded in the memory unit to detect whether an image change greater than or equal to a first threshold has occurred;

a determining unit configured to determine, when the image change greater than or equal to the first threshold has been detected by the comparator, whether a subsequent image change has converged to an amount less than or equal to a second threshold by comparing at least a third piece of image data and a fourth piece of image data recorded in the memory unit, the third and fourth pieces of image data having been captured following the first piece of image data and the second piece of image data; and a controller configured to exercise control so that image data captured via the imaging element is recorded on a predetermined recording medium when it is determined by the determining unit that the subsequent image change has converged to an amount less than or equal to the second threshold.

* * * * *